(12) United States Patent
Noel et al.

(10) Patent No.: US 8,719,943 B2
(45) Date of Patent: *May 6, 2014

(54) INTRUSION EVENT CORRELATION SYSTEM

(75) Inventors: Steven E Noel, Dale City, VA (US);
Sushil Jajodia, Oakton, VA (US); Eric B Robertson, Vienna, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/466,706

(22) Filed: May 8, 2012

(65) Prior Publication Data
US 2012/0227108 A1 Sep. 6, 2012

Related U.S. Application Data

(63) Continuation of application No. 12/758,135, filed on Apr. 12, 2010, now Pat. No. 8,181,252, which is a continuation of application No. 11/371,938, filed on Mar. 10, 2006, now Pat. No. 7,735,141.

(60) Provisional application No. 60/659,897, filed on Mar. 10, 2005, provisional application No. 60/659,896, filed on Mar. 10, 2005, provisional application No. 60/659,890, filed on Mar. 10, 2005.

(51) Int. Cl.
*H04L 29/06* (2006.01)

(52) U.S. Cl.
USPC ............... 726/25; 726/22; 726/23; 726/24; 709/223; 709/224

(58) Field of Classification Search
USPC .............. 726/22–25; 709/223–224
See application file for complete search history.

(56) References Cited

U.S. PATENT DOCUMENTS

| | | |
|---|---|---|
| 7,039,953 B2 | 5/2006 | Black |
| 2003/0097588 A1 | 5/2003 | Fischman |
| 2006/0041659 A1 | 2/2006 | Hasan |
| 2006/0059557 A1 | 3/2006 | Markham |
| 2006/0070128 A1 | 3/2006 | Heimerdinger |

OTHER PUBLICATIONS

Scalable, Graph-Based Network Vulnerability Analysis by Ammann et al; Publisher: ACM; Year: 2002.*
Computer-Attack Graph Generation Tool by Swiler et al; Publisher: IEEE; Year: 2001.*
Two Formal Analyses of Attack Graphs by Jha et al; Publisher: IEEE; Year 2002.*
"Constructing Attack Scenarios through Correlation of Intrusion Alerts," Ning et al., ACM, Nov. 18-22, 2002.

(Continued)

*Primary Examiner* — Madhuri Herzog
(74) *Attorney, Agent, or Firm* — MDIP LLC

(57) ABSTRACT

Disclosed is a system for correlating intrusion events using attack graph distances. The system includes an attack graph generator, an exploit distance calculator, an intrusion detector, an event report/exploit associator, an event graph creator, an event graph distance calculator, a correlation value calculator, and a coordinated attack analyzer. An attack graph is constructed for exploits and conditions in a network. The exploit distance calculator determines exploit distances for exploit pair(s). The intrusion detector generates event. Events are associated with exploits. Event graph distances are calculated. Correlation values are calculated for event pair(s) using event graph distances. The correlation values are analyzed using a correlation threshold to detect coordinated attacks.

10 Claims, 11 Drawing Sheets

(56) References Cited

OTHER PUBLICATIONS

"Alert Correlation in a Cooperative Intrusion Detection Framework," IEEE, 2002.
"High Speed and Robust Event Correlation," Yemini et al., IEEE, 1996.
"Building Attack Scenarios . . . Complementary Alert Correlation Methods," Ning et al., NDSS, 2004.
"Efficient Minimum-Cost Network . . . Exploit Dependence Graphics," Noel et al., IEEE, 2003.
"Automated Generation and Analysis of Attack Graphics," Sheyner et al., IEEE, 2002.
"Using Model Checking to Analyze Network Vulnerabilities," Ammann et al., IEEE, 2002.
"Analyzing Intensive Intrusion Alerts via Correlation," Ning et al., Springer, 2002.
"Tools for Generating and Analyzing Attack Graphics," Sheyner et al., Springer-Verlag, 2004.

* cited by examiner

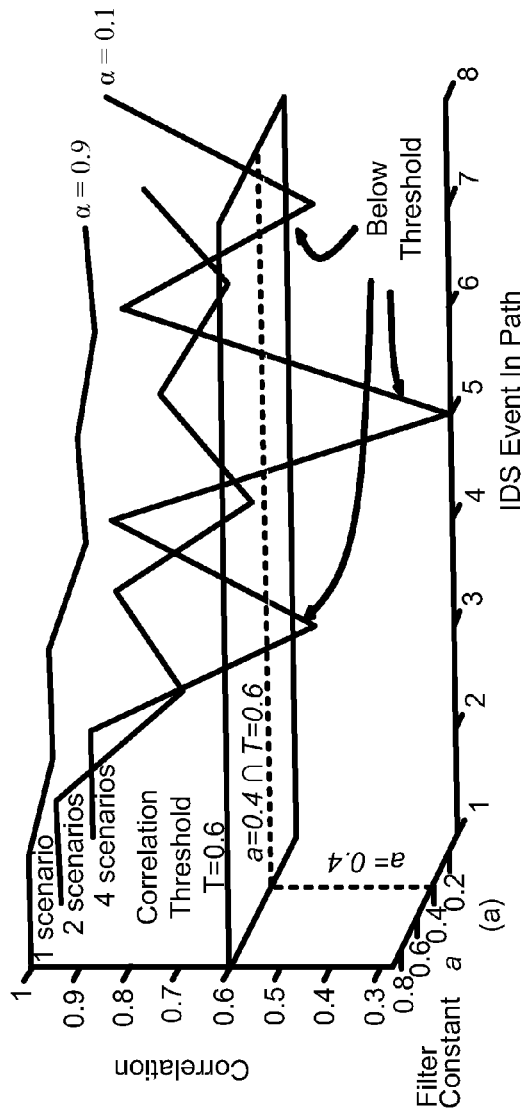
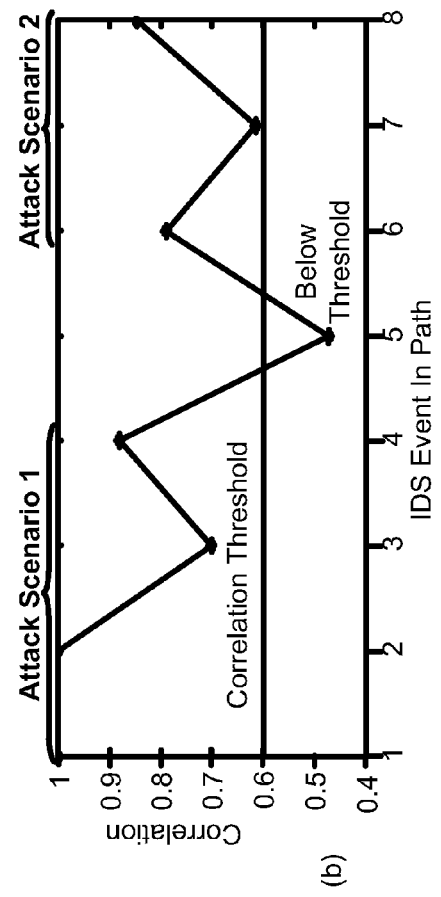
FIG. 7A
FIG. 7B

INTRUSION EVENT CORRELATION SYSTEM

CROSS-REFERENCES TO RELATED APPLICATIONS

This application is a continuation of U.S. Ser. No. 12/758,135 filed 12 Apr. 2010, now U.S. Pat. No. 8,181,252 which issued 15 May 2012, which is continuation of U.S. Ser. No. 11/371,938 filed 10 Mar. 2006, now U.S. Pat. No. 7,735,141 which issued 8 Jun. 2010, which claims the benefit of: U.S. Ser. No. 60/659,897 filed 10 Mar. 2005; U.S. Ser. No. 60/659,896, filed 10 Mar. 2005; and U.S. Ser. No. 60/659,890, filed 10 Mar. 2005, the content of each of which hereby is incorporated by reference in entirety.

STATEMENT REGARDING FEDERALLY FUNDED SPONSORED RESEARCH OR DEVELOPMENT

The U.S. Government has a paid-up license in this invention and the right in limited circumstances to require the patent owner to license others on reasonable terms as provided for by the terms of: Contract No. F30602-00-2-0512 awarded by the Air Force Research Laboratory, Rome; Grant No. DAAD19-03-1-0257 awarded by the Army Research Office; and Contract No. W911QX-04-C-0101 awarded by the Army Research Laboratory.

BRIEF DESCRIPTION OF THE SEVERAL VIEWS OF THE DRAWINGS

The accompanying drawings, which are incorporated in and form a part of the specification, illustrate embodiments of the present invention and, together with the description, serve to explain the principles of the invention.

FIG. 7 shows event-distance filtering and threshold events in an example experiment.

DETAILED DESCRIPTION OF EMBODIMENTS

Figure 1:
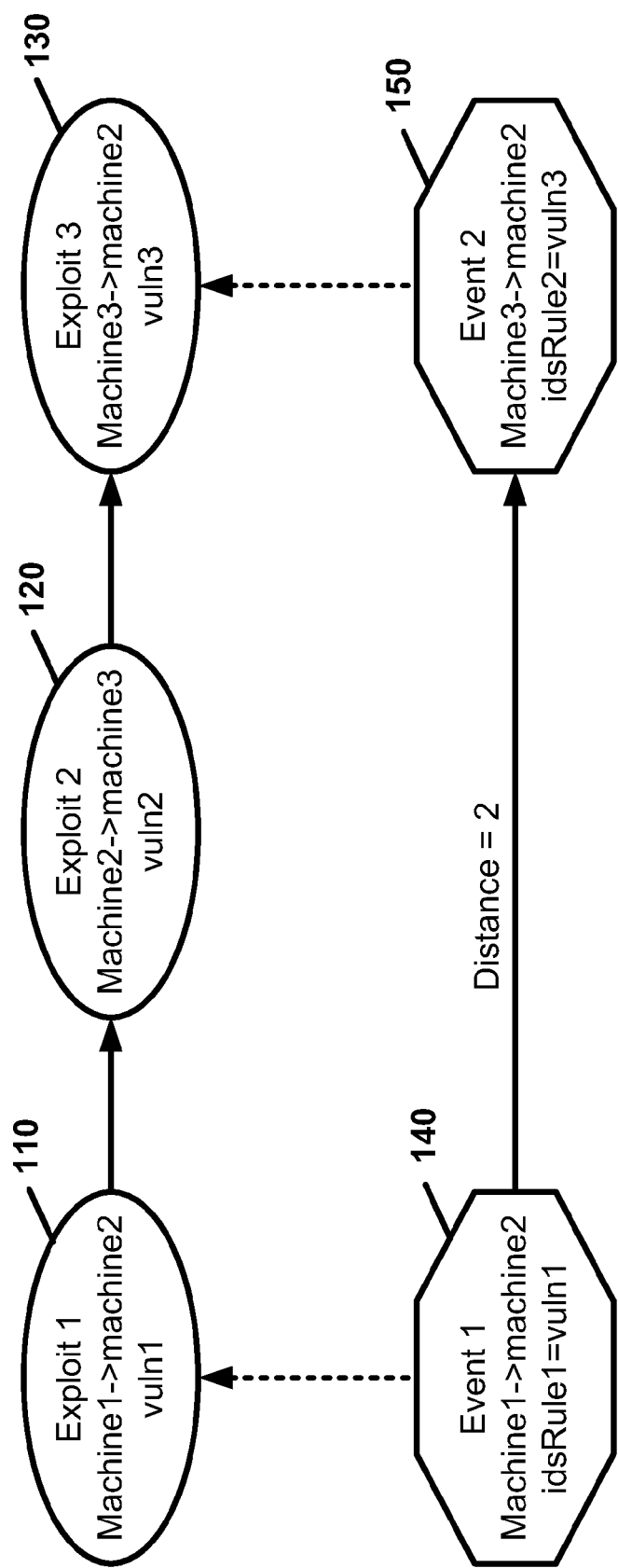
FIG. 1 is an example diagram showing partially correlated events.

Present embodiments map intrusion events to known exploits in a network attack graph, and correlate the events through corresponding attack graph distances. From this, attack scenarios may be constructed, and scores for the degree of causal correlation between their constituent events may be provided, as well as an overall relevancy score for each scenario. Missed detections may be handled through the analysis of network vulnerability dependencies. Lack of knowledge is quantified through attack graph distance. Low-pass signal filtering of event correlation sequences may be used in an attempt to improve results in the face of erroneous detections. Additionally, a correlation threshold may be applied for creating strongly correlated attack scenarios. This system allows for attack graphs and their exploit distances to be computed offline. Online event processing should only require a database lookup and a small number of arithmetic operations, making the approach feasible for real-time applications.

Many intrusion detection systems focus on and report events independently. Report aggregation may reduce the number of initially reported results by combining independent event alerts. This aggregation may reduce administrator workload and provide higher-level situational awareness. Ideally, report aggregates should help one distinguish coordinated, multi-step attacks from isolated events. Also, knowing if one's network is actually vulnerable can help detect attacks, and not just from the standpoint of individual machines but also in the context of the overall network and its resources.

There are various approaches to correlate intrusion reports and build attack scenarios from them. One method to building attack scenarios includes using causal correlation, which is based on analyzing dependencies among intrusion events. An example of causal event correlation is to apply logical rules that chain together events based on their relevant attributes. Another example of causal correlation is to represent relationships among events with graphs instead of logical rules. These approaches often model intrusion events in terms of rules (preconditions/postconditions) for the implicit exploits. Attack scenarios may also be built by explicitly including network vulnerability/exploit relationships (i.e., the attack graph) in the model. In other words, the network attack graph may add context to the exploits implied by intrusion events.

This system may maintain low overhead for online event processing by using a manageable set of pre-computed attack graph distances. Therefore, online intrusion event processing may be performed using a distance lookup and a small number of arithmetic operations.

A joint model of attacker exploits and network vulnerabilities may be built. The network vulnerability model may be created either manually or automatically from the output of a vulnerability scanner such as the Nessus vulnerability scanner available from Tenable Network Security, Inc. in Columbia, Md. From the joint exploit/vulnerability model, distances (number of steps in the shortest path) may be computed between each pair of exploits in the attack graph. This may even be done for all possible network attacks. These distances should provide a concise measure of exploit relatedness, which we use for subsequent online causal correlation of intrusion detection events.

As detection events occur, attack graph exploits may be mapped between them, and the distances between pairs of corresponding exploits looked up. This allows events to be correlated through attack graph information, without the online overhead of rule execution or graph building. Event paths may be built iteratively, with a numeric correlation score for each event. Missing events may be handled in numerous ways such as quantifying gaps in attack scenarios through attack graph distances. Events that cannot be mapped to the attack graph initially can be considered in post-analysis and possibly merged with existing attack scenarios.

Sequences of correlation scores over event paths may indicate likely attack scenarios. A low-pass signal filter (such as an exponentially weighted moving average filter) may be applied to correlation sequences. Hopefully, this will improve quality in the face of detection errors. A threshold may be applied to filtered correlations to separate event paths into attack scenarios, i.e., only paths with sufficient correlation (sufficiently small attack graph gaps) are placed in the same attack scenario. Overall relevancy score may also be computed for resulting attack scenarios. This should measure the extent that the attack scenarios populates a path in the attack graph.

The underlying model: Construction of network attack graphs may be based on the application of attacker exploit rules. These rules preferably map the conditions for exploit success (preconditions) to conditions induced by the exploit (postconditions). For example, an exploit may require user privilege on the attacker machine and yield root privilege on the victim machine. An attack graph may be constructed by finding the interdependencies of exploits with respect to machines on a network.

While a scalable (low-order polynomial) attack graph representation may be employed, the cost of attack graph computation may still prohibit online calculation per intrusion event. Therefore, the attack graph may need to be fully realized before events occur. Once a report (alarm) is raised, its event may be mapped to an exploit in the attack graph. Multiple precondition/postcondition dependencies between exploits can be represented with a single graph edge, meaning that the "to" exploit depends on at least one postcondition of the "from" exploit.

A typical scenario for network vulnerability analysis includes an initial attacking machine (either outside or inside the administered network) and a set of attack goal conditions (e.g., root) on one or more machines. Given that an exploit's preconditions are met, the state of the victim machine changes per the exploit's postconditions. Upon success of an exploit, the conditions of the victim machine may meet other exploits launched from that machine. Successful exploits launched from the victim machine may be linked to the exploits that provide its preconditions. By executing and linking exploits in this fashion, an attack graph may be formed.

For constructing attack scenarios, it may be preferable that the attack graph is not based on a fixed attacker/goal scenario as is typically done in network vulnerability analysis. Neither the goal nor the attacker may be known when the attack graph is computed, before intrusion events are actually considered. The assumption is that attacks can come from any machine inside or outside an administered network. The attacker may have infiltrated the network through stealth attacks, or the attack may have come from an insider who abuses his granted privileges. Similarly, the attack goal may be open, since it could be any adverse condition (such as denial of service, root privilege, or unauthorized data access) on any machine. In short, our model attempts to consider the full scope of possible attack paths.

Two events that fall on a connected path in an attack graph may be considered correlated (at least to some extent). Clearly, events should be fully correlated if they map to adjacent exploits in the attack graph, since this is the strongest relationship possible. Conversely, events mapped to non-adjacent exploits are only partially correlated, as shown in FIG. 1, which is an example diagram showing partially correlated events 140 and 150. In this case, the degree of event correlation may be determined through graph distance between corresponding exploits 110, 120 and 130.

The graph distance between a pair of exploits is preferably the minimum length of the paths connecting them. If no such path exists, then the distance may be considered infinite. Graph distance should measure the most direct path an attacker can take between two exploits. While longer paths might be possible between exploits, the shortest path may be the best assumption for event correlation, and may also be the most efficient to compute. The use of minimum path length should not hinder the ability to analyze longer paths, since these paths are constructed by assembling shorter paths. Using minimum path lengths also resolves cycles in the attack graph, which would otherwise indicate redundant attack steps. These graph distances can be unweighted, i.e., no weights are applied to graph edges between exploits.

The exploit distances may be pre-computed once for an attack graph, and then applied continuously for a real-time stream of intrusion events. The exploit distances should supply the necessary information to form event paths. An event may be added to the end of a path if it maps to an exploit that has a finite distance from the exploit mapped to the last event in the path. Event time is naturally accounted for, because events are added at the ends of paths, which were constructed from prior events. If a new event is unreachable from all existing event paths (i.e., if the corresponding attack graph distances are infinite), then the event may form the beginning of a new path.

Figure 2:
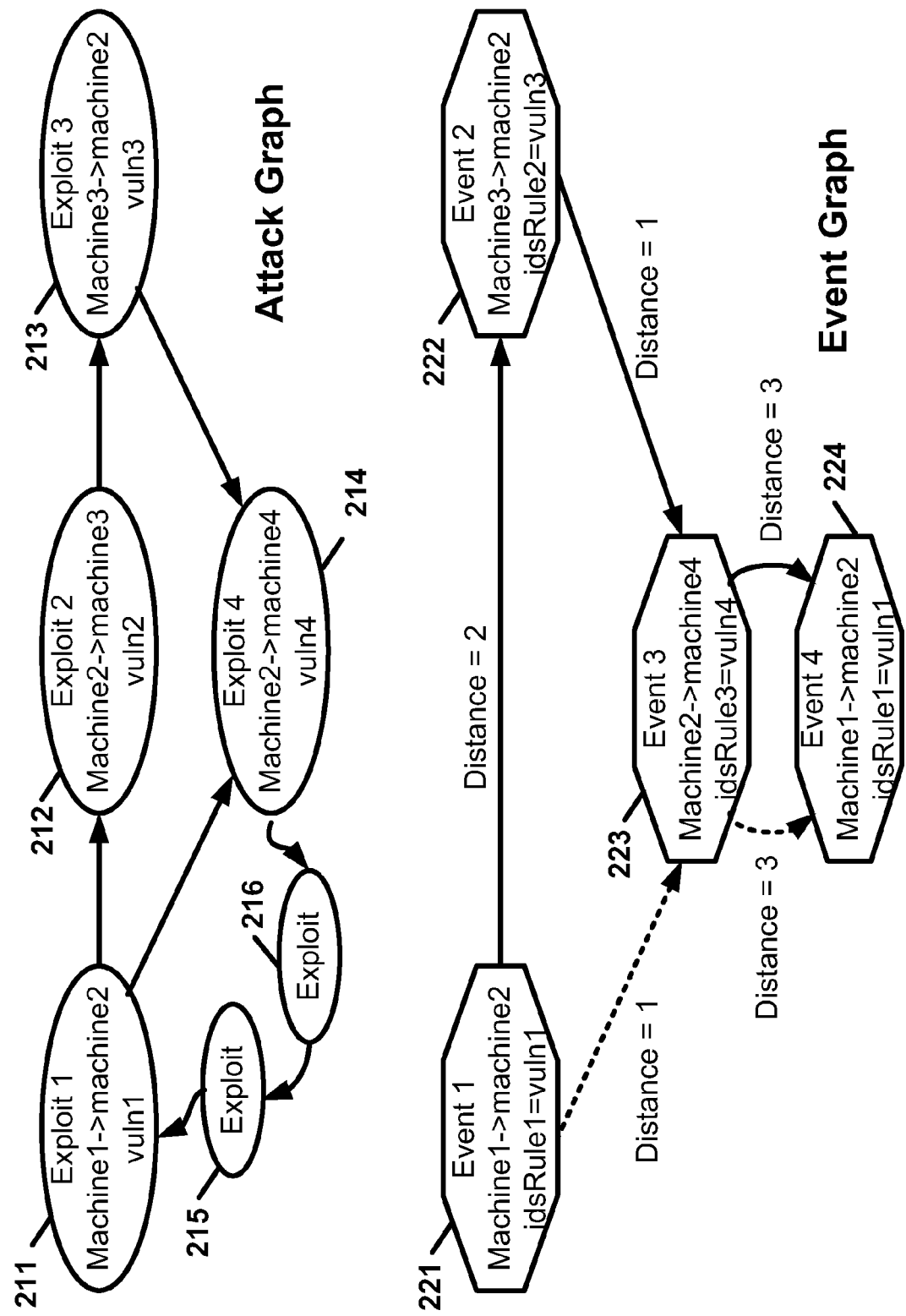
FIG. 2 is an example diagram showing the creation of event paths as per an embodiment of an aspect of the present invention.

FIG. 2 is an example diagram showing the creation of event paths as per an embodiment of an aspect of the present invention. In FIG. 2, suppose an initial event path exists as Event 1 221, corresponding to Exploit 1 211. A new Event 2 222 arrives, corresponding to Exploit 3 213. Since Exploit 3 213 is reachable from Event 1 221 with a graph distance of 2, Event 2 222 is added to the event path. A new event may trigger the creation of additional independent event paths. Continuing with our example, suppose a new Event 3 223 arrives, which corresponds to Exploit 4 214. Exploit 4 214 is reachable from both Exploit 1 211 and Exploit 3213. Therefore, Event 3 223 can be correlated to Event 1 221 independently of Event 2 222. Since Event 2 222 might have nothing to do with Event 1 221, a new path is created as a record of another potential attack scenario. Thus we have the 2 paths Event 1→Event 2→Event 3 and Event 1→Event 3. In the figure, these 2 paths are drawn with solid lines and dashed lines, respectively, in the event graph.

In this model, cycles in the event graph may be unrolled. For example, in FIG. 2, Exploit 4 214 can reach back to Exploit 1 211 through a distance of 3. Event 4 224 occurs after Event 3 223, and is identical to Event 1 221, i.e., it also maps to Exploit 1 211. For example, Exploit 4 214 might yield new privileges based on trust gained from the intervening 3 exploits. Thus two new paths are formed:

1.Event 1→Event 2→Event 3→Event 4 (solid lines)
    2.Event 1→Event 3→Event 4 (dashed lines)

These are shown with solid and dashed lines, respectively, in FIG. 2.

For the example in FIG. 2, the events correspond to exploits that lie within relatively close distances to each other. But this may often not be the case. Indeed, it is reasonable to assign events whose exploits are widely separated in the attack graph to separate attack scenarios. Since event distances greater than unity could represent missed detection events (according to the attack graph), it is possible that such distances sometimes occur within a set of coordinated attacks, since real attacks are sometimes missed. But when event distances become larger, larger numbers of attacks would need to be missed if they were really coming from a coordinated attack.

Thus, a correlation threshold may be applied that segments event paths into highly correlated attack scenarios. In other words, a consecutive sequence of events that lies above the threshold defines an attack scenario. When individual event paths are formed from the incoming stream of events, new event paths may be created when a new event is not reachable (infinite distance) from the currently existing set of event paths. In this way, event paths have an obvious beginning based on (non-) reachability. The correlation threshold provides a way to end an event path when the distance to the next event is too large, but is still finite.

The distances between events in an event path may be crucial information. But because of possible false detections (positive and negative), the individual distance values can be somewhat suspect. More confidence may be gained in the estimate by averaging the individual distance values. While this would capture the global trend of the event path, local trends could be lost. Also, it may be convenient to invert the event distances (use their reciprocals), so that they lie in the range [0,1], with larger values representing stronger correlation. Thus the inverse distances would now represent similarities rather than dissimilarities.

But rather than computing the global average of inverse event distances, a moving average could be computed, which has the ability to capture local trends while still providing error resiliency. An unweighted moving average can define a data window, and treat each data point in the window equally when calculating the average. However, it is reasonable to assume the most current events tend to better reflect the current security state. Therefore, the exponentially weighted moving average, which places more emphasis on more recent events by discounting older events in an exponential manner, may be applied. It is known to be identical to the discrete first-order low-pass signal filter.

Let $d_k$ be the attack graph distance between a pair of intrusion events. Then the inverse event distance is $x_k=1/d_k$. Then applying the exponentially weighted moving average filter to a sequence of these $x_k$:

$$\bar{x}_k = \alpha \bar{x}_{k-1} + (1-\alpha)x_k. \quad (1)$$

The sequence of values of $\bar{x}_k$ is the filtered version of the original sequence of inverse event distances, $x_k$, for some filter constant $0 \leq \alpha \leq 1$. The filtered inverse event distances $\bar{x}_k$ are the basic measure of event correlation in this model. For convenience, a correlation of unity for the first event in a path may be defined (i.e., it is fully correlated with itself), even though there is no previous event to compare it to.

The inverse intrusion event distances may be filtered very efficiently through the recursive formulation in Equation (1). Computation requires no storage of past values of x, and only one addition and 2 multiplications per data point are required.

In the exponentially weighted moving average filter, the filter constant $0 \leq \alpha \leq 1$ dictates the degree of filtering. As $\alpha \to 1$, the degree of filtering is so great that individual event (inverse) distances do not contribute to the calculation of the average. On the other extreme, as a $\alpha \to 0$, virtually no filtering is performed, so that $\bar{x}_k \to x_k$. Values in the range of $0.3 \leq \alpha \leq 0.4$ generally work well in practice.

The filtered inverse distances in Equation (1) provide a good local measure of event correlation. In particular, they perform well for the application of the score threshold for segmenting event paths into attack scenarios. But once an attack scenario is formed, the individual filtered inverse distances do not provide an overall measure of correlation for it. Another score is introduced that provides a measure of relevancy for the entire scenario, based on attack path occupancy by events.

For attack scenario, $s_k$, $|s_k|$ is the number of events in the scenario. Next, let $l_k$ be the cumulative distance between pairs of events in the scenario. Then the attack scenario relevancy score $r_k$ is $$r_k = |s_k|/l_k. \quad (2)$$

Because the cumulative distance $l_k$ is the length of the attack path that the scenario maps to, this relevance score $r_k$ may be the proportion of the attack path actually occupied by an attack scenario's intrusion events.

This model is robust with respect to inconsistencies between events and vulnerabilities. Events that cannot be mapped to an exploit in the attack graph simply remain as isolated events. This might occur because there is no known mapping from a particular event to a vulnerability, or because a certain vulnerability was not known when constructing the attack graph. The converse is that there are certain vulnerabilities in the attack graph that have no corresponding intrusion detection signature. In this case, distances between events (in event paths) can be normalized by the expected distance between corresponding exploits in the attack graph.

Figure 3:
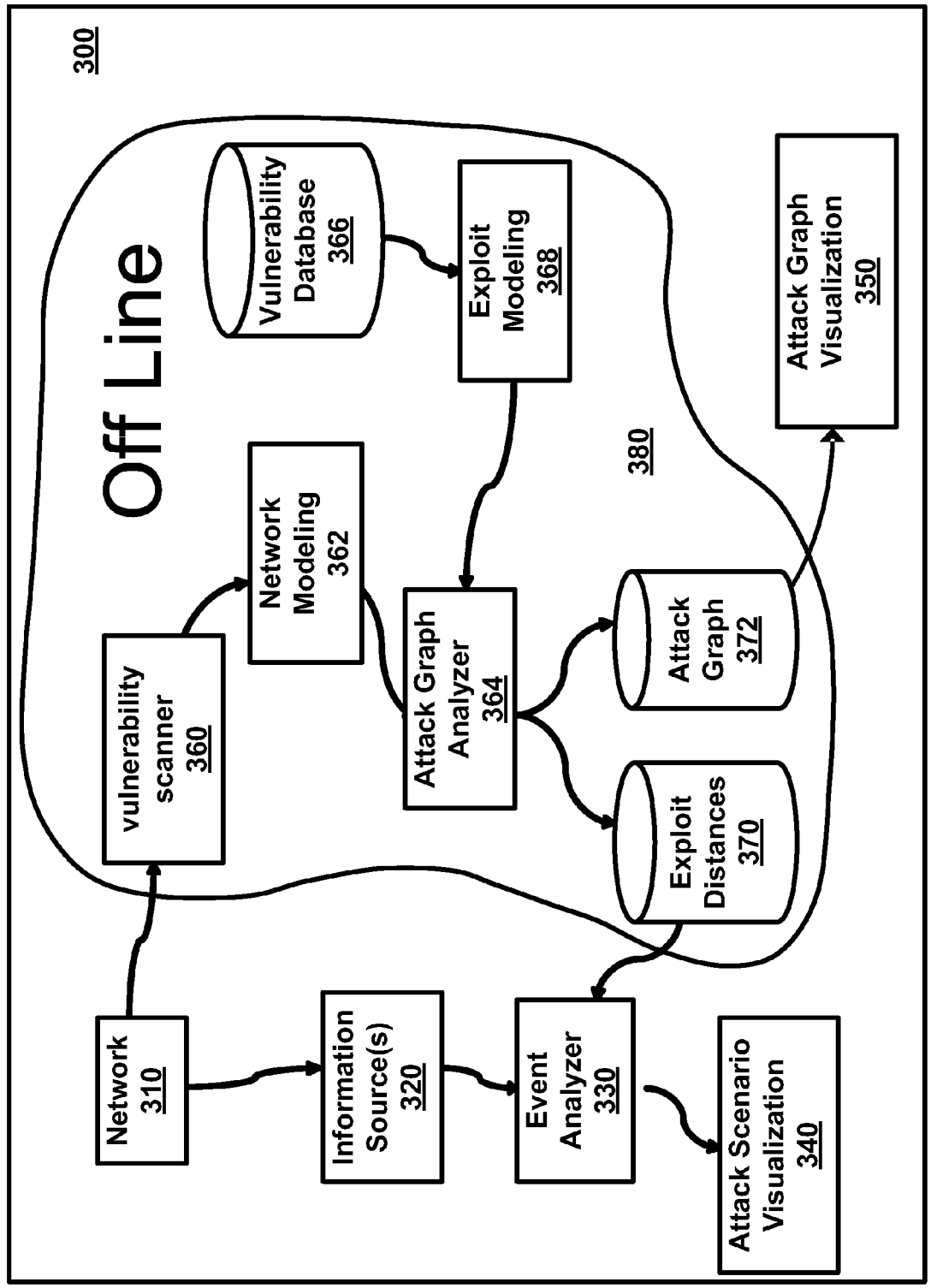
FIG. 3 is a system architecture diagram as per an embodiment of an aspect of the present invention.

Embodiment Implementation Details: FIG. 3 is a system architecture diagram 300 as per an embodiment of an aspect of the model described in the previous section. The Attack Graph Analyzer 364 may require a joint model of the network and attacker exploits 362. Exploit Modeling 368 may be done through manual analysis of reported vulnerabilities 366 and known exploits. For example, one could research and model Nessus vulnerabilities. To minimize efforts one could limit the modeling to the most relevant vulnerabilities. Because exploits are generally modeled at a relatively high level of abstraction (e.g., in terms of access type, privilege level, and network connection), this manual process should proceed relatively quickly.

Accurate modeling may depend on sufficient information about vulnerabilities and exploits. Exploit modeling 368 could be supported by extensive databases from information sources 320 such as X-Force, Bugtraq, CVE, CERT, Nessus, and Snort. X-Force Threat Analysis Service (XFTAS) is a paid subscription service Network available from Internet Security Systems, Inc. of Atlanta, Ga. Bugtraq is a mailing list for the discussion of security exploits and security bugs and may be subscribed to through SecurityFocus Symantec Corporation of Calgary, AB, Canada. CVE, which stands for "Common Vulnerabilities and Exposures," is a list of standardized names for vulnerabilities and other information security exposures and may be obtained through MITRE Corporation of McLean, Va. CERT is a Coordination Center that coordinates communication among electronic security experts and is based at Carnegie Mellon University in Pittsburgh, Pa. Snort® is an open source network intrusion prevention and detection system and may be obtained through Sourcefire, Inc. in Columbia, Md.

Modeling can be done manually, or generated automatically from tools like the Nessus vulnerability scanner output. In the case of network models created manually, it may be preferable to support model specifications in terms of vulnerable software components (OS, patch level, web servers, configuration files, etc.), with rules to map to the vulnerabilities.

From the combined network 362 and exploit 368 model(s), attack paths may be analyzed and the resulting exploit distances loaded into an exploit distances database 370 such as an Oracle database. Software to support Oracle databases may be obtained from Oracle Corporation of Redwood Shores, Calif. For efficiency, infinite distances (caused by some exploits not being reachable to others) do not have to be recorded in the database. Rather, they may be represented by their absence. In practice, a value can be chosen as an effective infinity, giving the distance computation algorithm a reasonable stopping point in declaring an exploit unreachable. Once exploit distances are calculated, they can become a static image of the attack graph 372 to be correlated with intrusion events. The attack graph 372 itself may also be stored for future offline attack graph visualization and post-analysis. All of this processing may be done offline, as shown by region 380 in FIG. 3.

Snort may be used as an event analyzer 330 to detect intrusion events. When Snort intrusion detection events are logged in a database, Oracle stored procedures may be triggered in the Event Analyzer 330 to process them. For each Snort event, the Snort identifier may be mapped to the corresponding Nessus vulnerability identifier. In the case that a Snort identifier maps to multiple Nessus identifiers, all the identifiers may be reported, and conservatively select the shortest distance from among the candidate exploits for computing the correlation score. The lookup of pre-computed attack graph distances may be based on source and destination IP addresses and Nessus vulnerability identifier. Note that only the distances between exploits should need to be looked up, and thus, little or no processing of the actual attack graph should need to occur online.

Event paths may be formed in the manner previously described, i.e., by adding new events to the ends of paths if the new event is reachable from the last event in the path, etc. For each path of intrusion events, the Event Analyzer 330 can invert the distances between events (convert them from dissimilarities to similarities), then apply the exponentially weighted moving average filter in Equation (1) to the inverse distances. The correlation threshold may then be applied, as described previously, which segments event paths into highly correlated attack scenarios. In practice, proper values of correlation threshold should be based on expected rates of missed detections.

Figure 4:
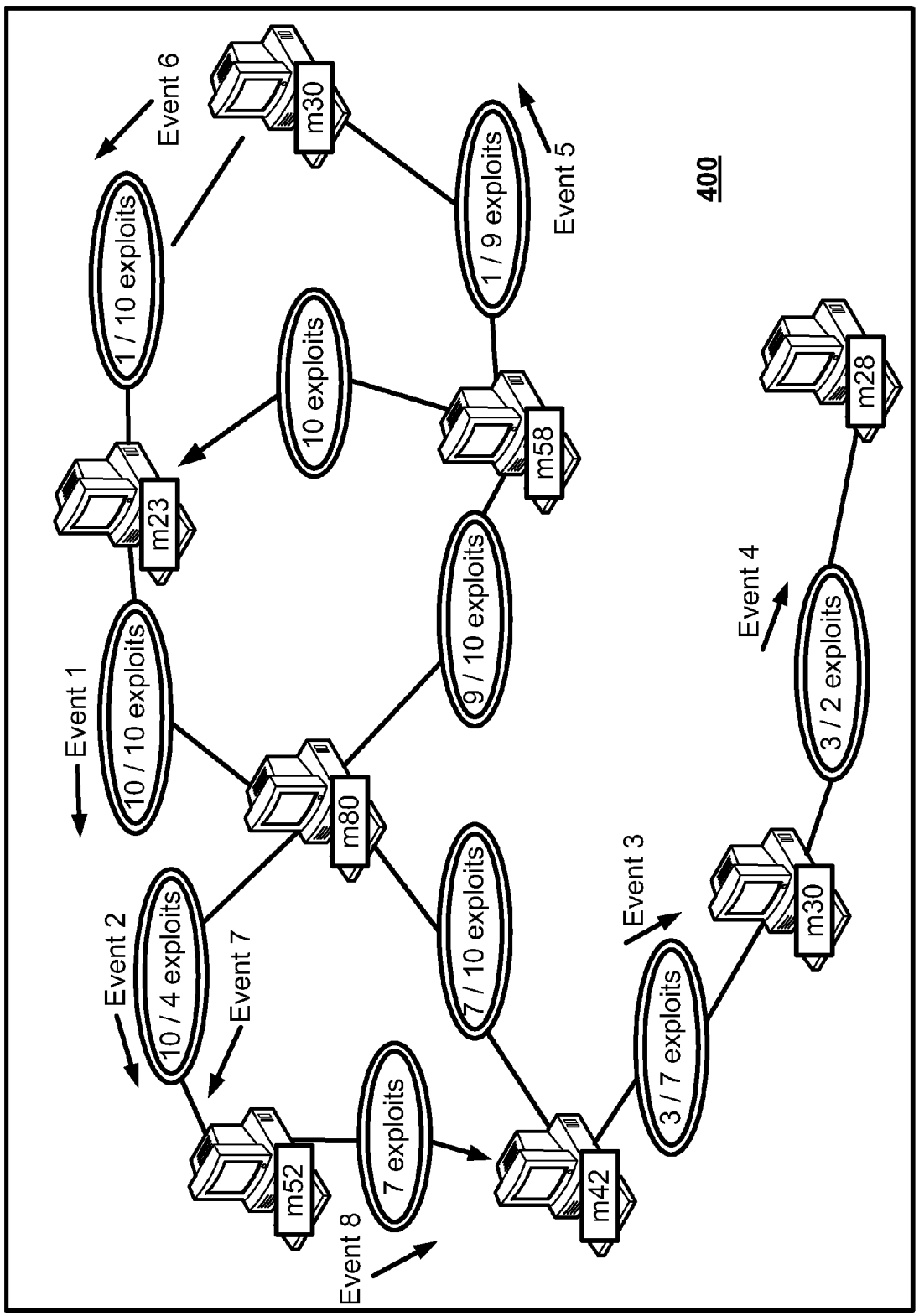
FIG. 4 shows an example aggregated attack graph.

Attack scenarios may be visualized by an attack scenario visualization module 340. This visualization may take many forms including a graph of events vs. correlation. Similarly, the attack graphs may be visualized 350, an example of which is shown in FIG. 4.

Experiments: To help explain the present correlation mechanism, a series of example experiments will be described. The first experiment focuses on the application of a correlation threshold for separating event paths into highly-correlated attack scenarios and the interaction between threshold value and low-pass filter constant. To instill a deeper understanding of this, a small number of attacks may be examined in greater detail. In the second experiment, low-pass filtering may be used to distinguish regions of similar attack behavior in the presence of intrusion detection errors. The third experiment incorporates a larger-scale scenario to demonstrate overall performance.

Scenario Building via Correlation Threshold: FIG. 4, an aggregated attack graph 400, is a concise summary of an attack graph for the first experiment. A network model in this experiment is generated from Nessus scans of real machines. In the figure, an oval between a pair of machines represents the set of exploits between that machine pair. In most cases, there are 2 numbers for exploit sets, reflecting the fact that some exploits are in one direction (from one machine to another), and other exploits are in the opposite direction. Unidirectional sets of exploits are drawn with directional arrowheads; for sets of exploits in both directions, arrowheads are omitted. This is a variation of an aggregated attack.

In this experiment, only remote-to-root exploits are included, to make results easier to interpret. That is, each exploit has preconditions of (1) execute access on the attacking machine and (2) a connection from the attacking machine to a vulnerable service on the victim machine, and postconditions of (1) execute access and (2) superuser privilege on the victim machine. Since connections to vulnerable services exist in the initial network conditions, and each exploit directly yields superuser access on the victim machine, the shortest exploit distance between machines is always one. In interpreting these distances from the figure, the actual numbers of exploits between pairs of machines are therefore irrelevant.

Attack graph distances between the 8 intrusion events in FIG. 4 may be determined directly from the figure. The arrow beside "Event x" indicates the direction (source and destination machine) of the event. So the distance from Event 1 (an exploit from machine m23 to m80) to Event 2 (an exploit from machine m80 to m52) is one, the distance from Event 2 to Event 3 is 2, etc.

Figure 5:
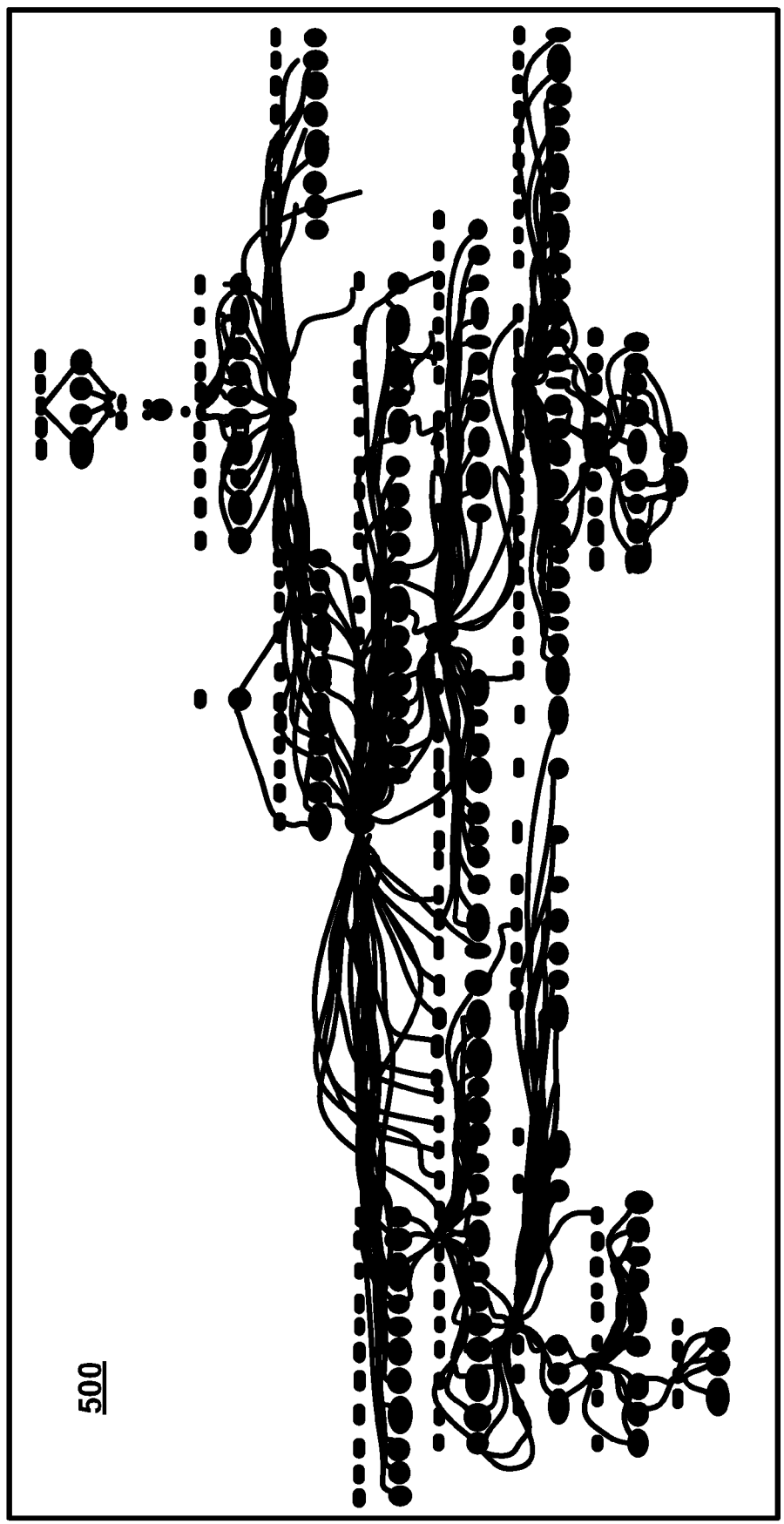
FIG. 5 shows an example Non-aggregated attack graph.

Counting the distance from Event 4 to Event 5 is a bit more subtle. Here one must realize that "3/2 exploits" means there 3 exploits from m30 to m28, one of which is associated with Event 4. Then from the Event-4 exploit, in counting the shortest path to Event 5, there is one exploit from m28 to m30, one from m30 to m42, etc., for a total distance of 5. A rough representation of a full non-aggregated attack graph 500 for this experiment is shown in FIG. 5. As one can see, because this example graph 500 is so large and detailed, it is hard to accurately represent. It is similarly difficult and cumbersome to use this complex graph for visually counting event distances.

Figure 6:
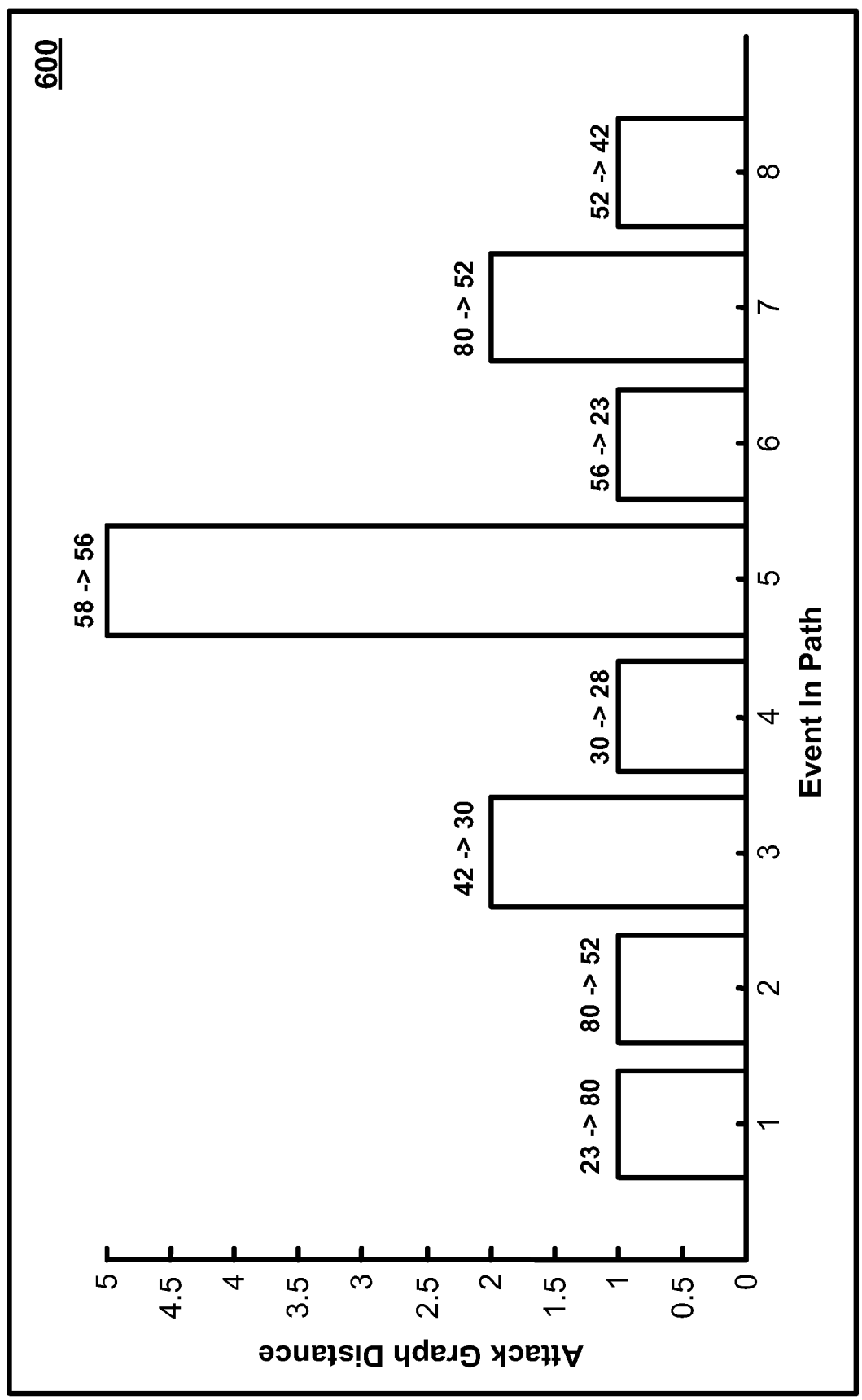
FIG. 6 shows attack graph distances for events in an example experiment.

In FIG. 6, graph 600 shows the sequence of attack graph distances for the events in this experiment. Because every event is reachable from the previous event, only a single event path is generated.

FIG. 7 shows distance filtering and threshold. Specifically, FIG. 7A shows the inverse of the attack graph distances from FIG. 6, filtered via Equation(1), for different values of filter constant $\alpha$. The vertical axis is the filtered inverse distance (i.e., the correlation score), the horizontal axis is the event number, and the axis into the page is $0.1 \leq \alpha \leq 0.9$. A correlation threshold value of T=0.6 is applied, shown as a horizontal plane.

For $\alpha$=0.1 (front of page), very little filtering is applied, so that the filtered sequence looks very similar to the original sequence of inverse distances. In this region of $\alpha$ values, for the threshold T=0.6, the event path is separated into 4 short attack scenarios:

1. Event 1→Event 2
2. Event 4
3. Event 6
4. Event 8

The remaining events (3, 5, and 7) fall below the threshold and may be considered isolated. However, the more likely scenario is that the distances=2 for Event 3 and Event 7 represent missed detections, since they are in the region of fully-correlated events. The distance=5 for Event 5 would require an unlikely high number of missed detections, so it is probably really is the start of a separate (multi-step) attack.

The problem is that, without adequate filtering, event distances are not being considered in the context of the recent history. One could lower the threshold to below T=0.5 in this case, which would yield these most likely attack scenarios:

1. Event 1→Event 2→Event 3→Event 4
2. Event 6→Event 7→Event 8

However, in general values below T=0.5 are not particularly strong correlations, so this is not advisable.

For larger values of $\alpha$ (going into the page), more filtering is applied, so that distance recent history is considered more strongly. In this case, the threshold does separate the path into the 2 most likely attack scenarios. A cross section for $\alpha$=0.4 is shown in FIG. 7B. For overly large values of $\alpha$ (e.g., in the region of $\alpha$=0.9), so much filtering is applied that the entire path is considered a single attack scenario. In other words, it misses Event 5 as the start of a new attack scenario.

Signal Filtering for Detection Errors: Next, we describe an experiment that more clearly shows the need for low-pass signal filtering for handling intrusion detection errors. In particular, this experiment demonstrates how low-pass filtering makes it easier to distinguish regions of similar attack behavior through the application of a correlation score threshold.

Figure 8:
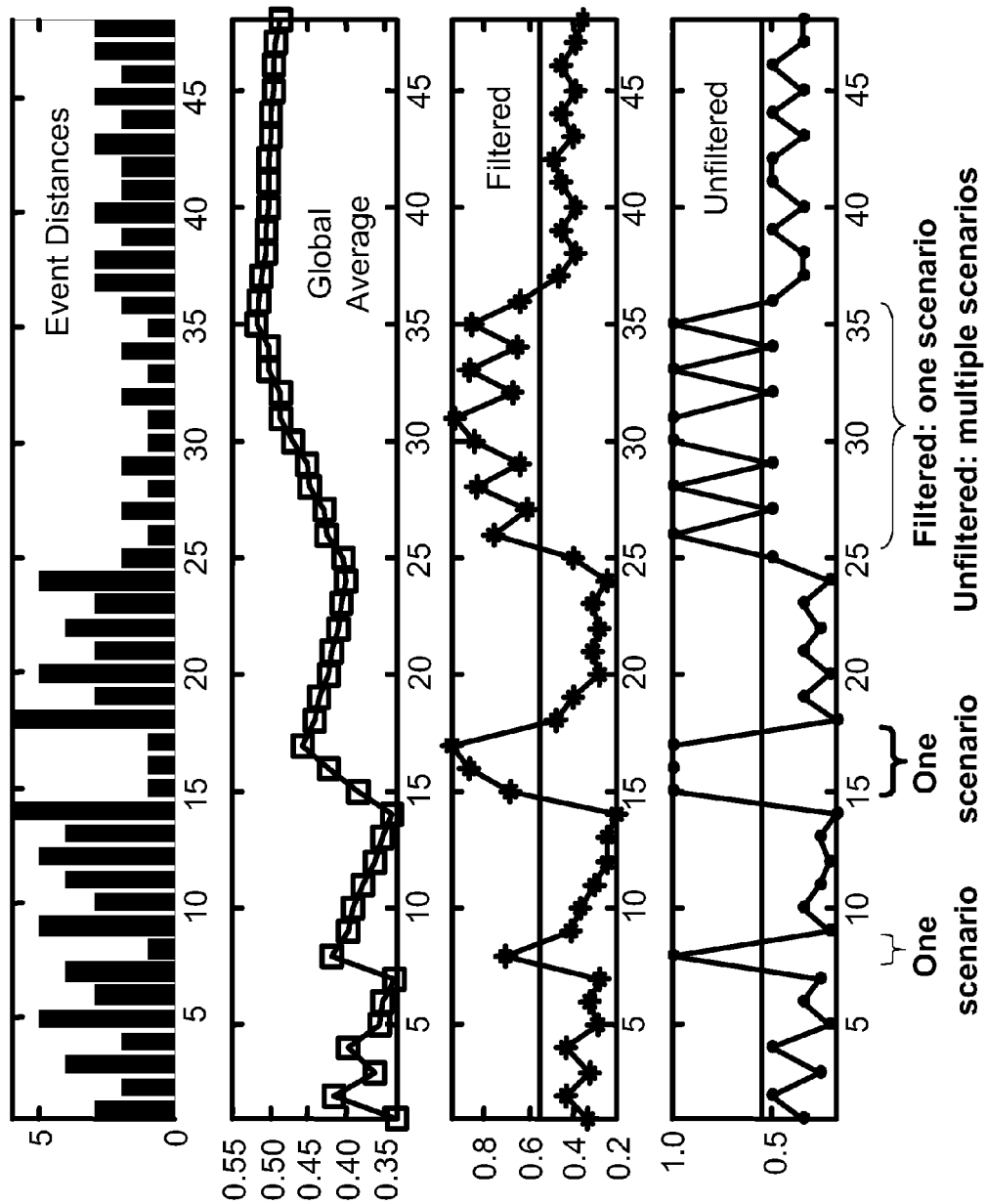
FIG. 8 shows filtering inverse event distances in an example experiment.

The results of this experiment are shown in FIG. 8. Here, the horizontal axis is the event in an event path. The vertical axes of the 4 plots are (respectively) raw attack graph distance between events, global average of inverse event distance, filtered inverse event distance, and unfiltered inverse event distance.

As a ground truth, the event path is divided into 7 regions. Region 1 (Events 1-7) is an uncoordinated series of events, i.e., one in which the events are unrelated and scattered across the network, so that distances between events are relatively long. Region 2 (Event 8) is a pair of events that occur immediately together in the attack graph (i.e., event distance=1, fully correlated). Region 3 (Events 9-14) is an uncoordinated series of events. Region 4 (Events 15-17) is a series of fully correlated events, and Region 5 (Events 18-24) is an uncoordinated series of events.

Regions 6 and 7 (Events 25-36 and Events 37-48, respectively) are a bit more subtle. In Region 6, the attack graph distances between events fluctuate between one and two. This represents a series of events for a single (multi-step) attack, or at least the work of a fairly consistently successful attacker. We could assume the distance=2 event pairs are from missed detections. In Region 6, the attack graph distances between events fluctuate between 2 and 3. In this case, it seems more likely to be an uncoordinated series of events that happen to occur more closely on the attack graph than say Region 1.

In FIG. 8, a global average (2nd from top in the figure) is included as a comparison to a moving average. While each value captures the overall average inverse distance up to a given event, that does not allow local decisions to be made (e.g., through a correlation threshold) for separating the path into individual attack scenarios. Even the occurrence of fully-correlated Region 4 events cannot be distinguished through the application of a threshold.

For the unfiltered inverse distances (bottom of FIG. 8), it should be possible to correctly distinguish the isolated pair of fully correlated events in Region 2, as well as the unbroken path of fully correlated events in Region 4. But there are problems for Region 6. This is the region in which fully correlated events are mixed with distance=2 events. This could be expected in a real sequence of attacks, when some of the attacks go undetected. Here, the unfiltered correlations fluctuate strongly, causing problems for setting a threshold for segmenting event paths into likely scenarios. At the threshold shown of 0.55, this region is segmented into multiple very small attack scenarios. The threshold could be lowered (to below 05), but that could cause problems for Region 7. Here, distance=2 and distance=3 event pairs are occurring. In this case, it is much less likely a coordinated attack is occurring. It would mean one or 2 attacks are repeatedly being missed, with no fully correlated events occurring. Lowering the threshold to handle Region 6 would cause Region 7 to be segmented into multiple very small scenarios.

In contrast, when the threshold is applied to the filtered version of the inverse event distances (2nd from bottom in FIG. 8), this forms attack scenarios corresponding to Regions 1 through 7. When filtering is applied, the distance for a new event takes into account the recent history of events, so that distances occurring after shorter distances tend to become shorter and distances occurring after longer distances tend to become longer. The degree of this effect is controlled by the filter constant, $\alpha$.

Performance: This experiment demonstrates overall performance using a large number of network attacks. In particular, the implementation was applied to a network of 9 victim machines, separated into 3 subnets illustrated in diagram 900 of FIG. 9.

Figure 9:
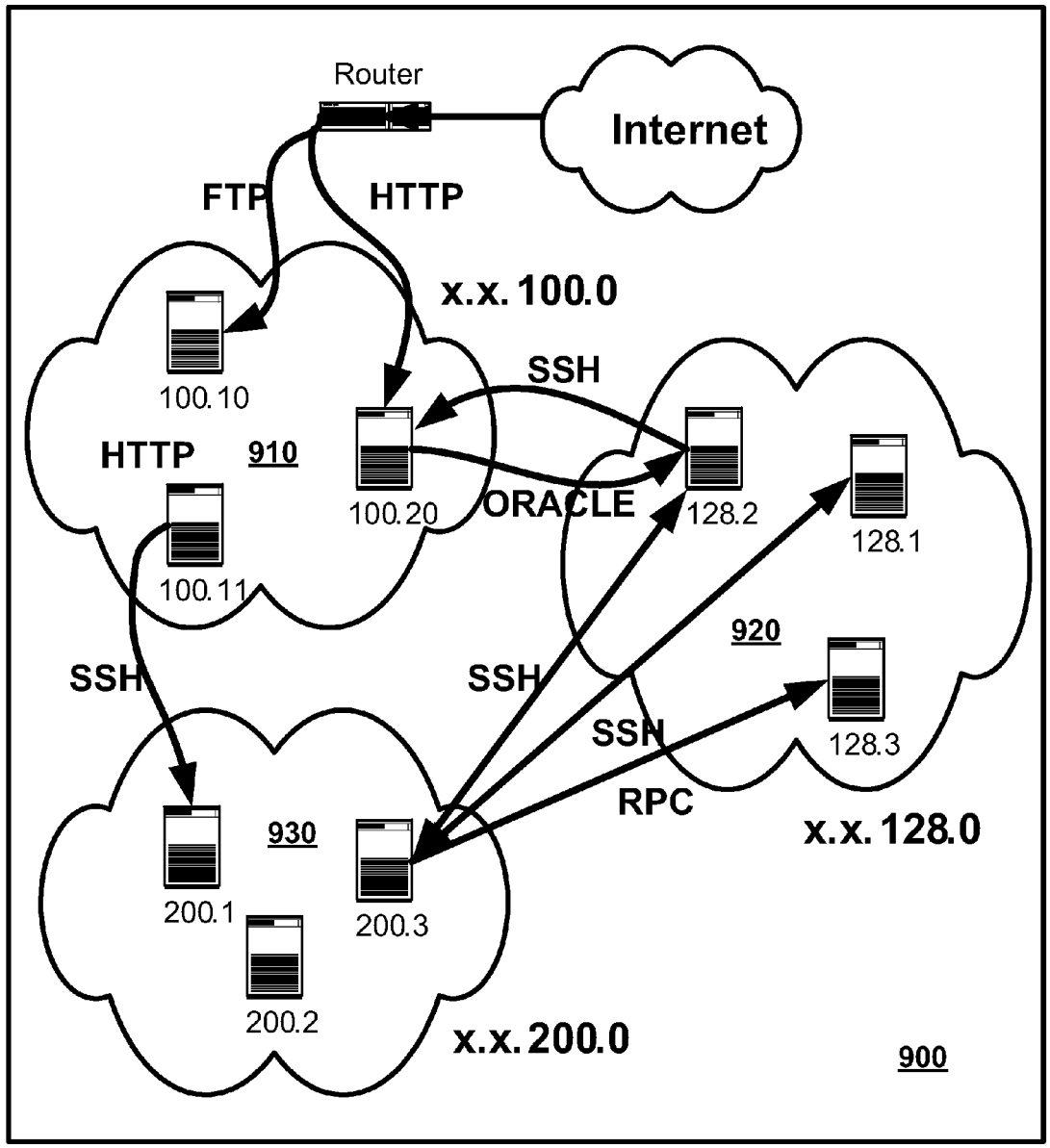
FIG. 9 shows network connectivity for a third example experiment.

In this experiment, subnet x.x.100.0 910 services internet traffic with a web server and an FTP server. Subnet x.x.128.0 920 supports administrative servers and an Oracle database server. Subnet x.x.200.0 930 is for administrative purposes. Traffic between subnets is filtered as shown in FIG. 9. Traffic within each subnet is unfiltered, so that there is full connectivity to vulnerable services among machines in a subnet.

The attack graph in this experiment contains 105 (machine-dependent) exploits. While there are $105^2=11025$ possible distances between 105 exploits, the exploits leading from the internet are not reachable from the remaining exploits, and such infinite distances are not recorded (using an adjacency list representation). In particular, there are 10,395 recorded exploit distances.

We then injected 10,000 intrusion events, mixed with random traffic. We included isolated events as well as multi-step attacks. Using a filter constant of $\alpha=0.4$ and a correlation threshold of 0.55, we correctly distinguished the multi-step attacks from the isolated events.

In online mode, it takes less than 4 minutes to process 10,000 events (about 24 milliseconds per event). This is on a machine with a 2-GHz processor, 1 megabyte of main memory, and two 100-gigabyte 15,000 RPM SCSI disk drives. Neither memory nor disk traffic showed more than 30% load.

Summary: This disclosure extends attack scenario building by explicitly including a network attack graph in the model. The attack graph provides the context for intrusion events, and provides graph distances upon which correlations may be based. Online event processing may depend on pre-computed attack graph distances only, and require only a lookup and a limited number of arithmetic operations.

To compute attack graph distances (offline), a model of attacker exploits and network vulnerabilities may be built. Preferably, the network vulnerability model may be generated automatically using the output of a vulnerability scanner. The distance of the shortest path between each pair of exploits in the attack graph may then be computed. These distances should be a concise measure of exploit relatedness, which may be used for subsequent online causal correlation of intrusion detection events.

From the online stream of intrusion events, individual event paths based on attack graph reachability may be built. The inverse distance between each event in a path is a measure of correlation. A low-pass filter may be applied to sequences of inverse distances to provide resiliency against detection errors. The application of a threshold to the filtered distances separates event paths into highly correlated attack scenarios. An overall relevancy score may also be computed for each resulting attack scenario.

Figure 10:
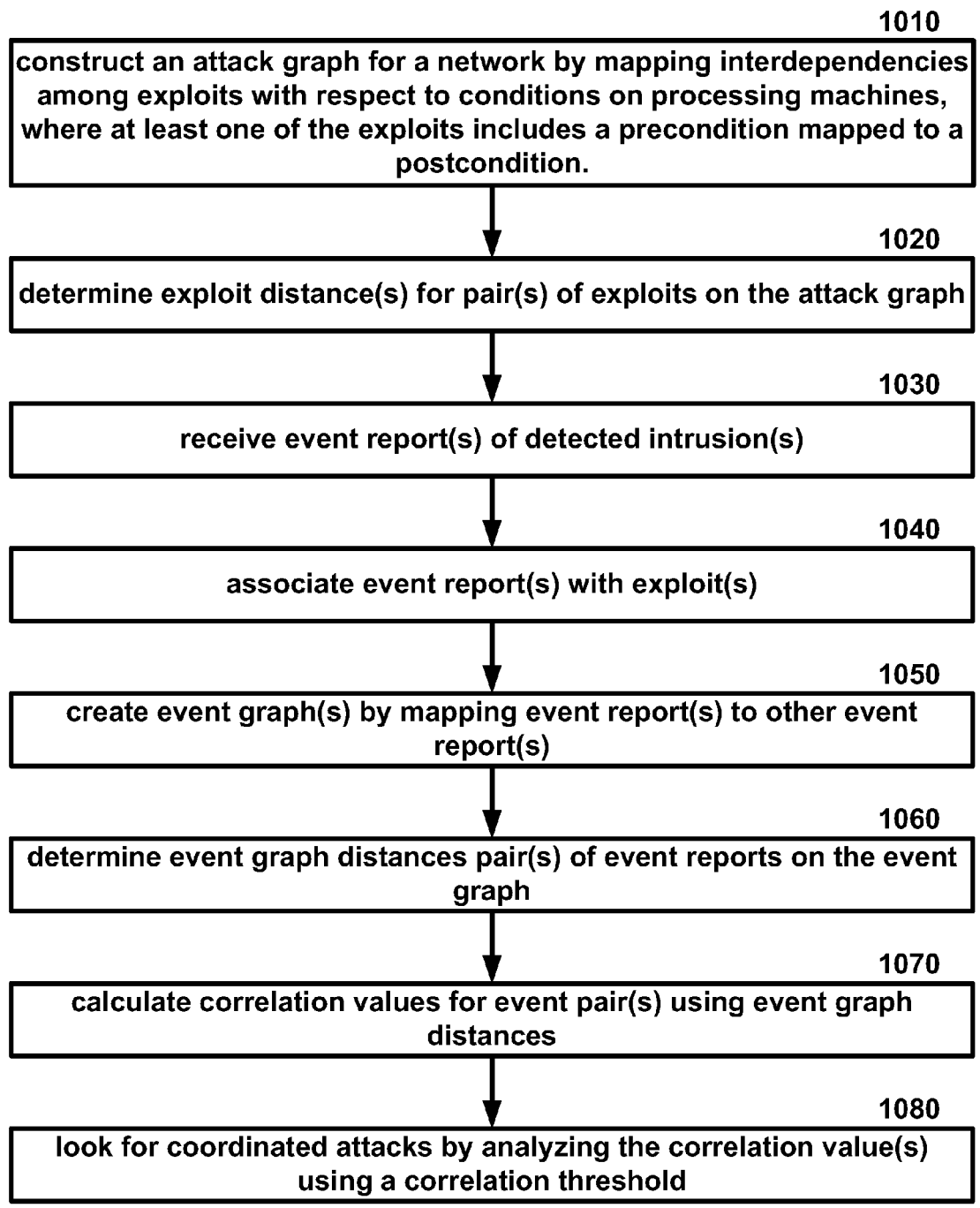
FIG. 10 is a flow diagram of an aspect of an embodiment of the present invention.
Figure 11:
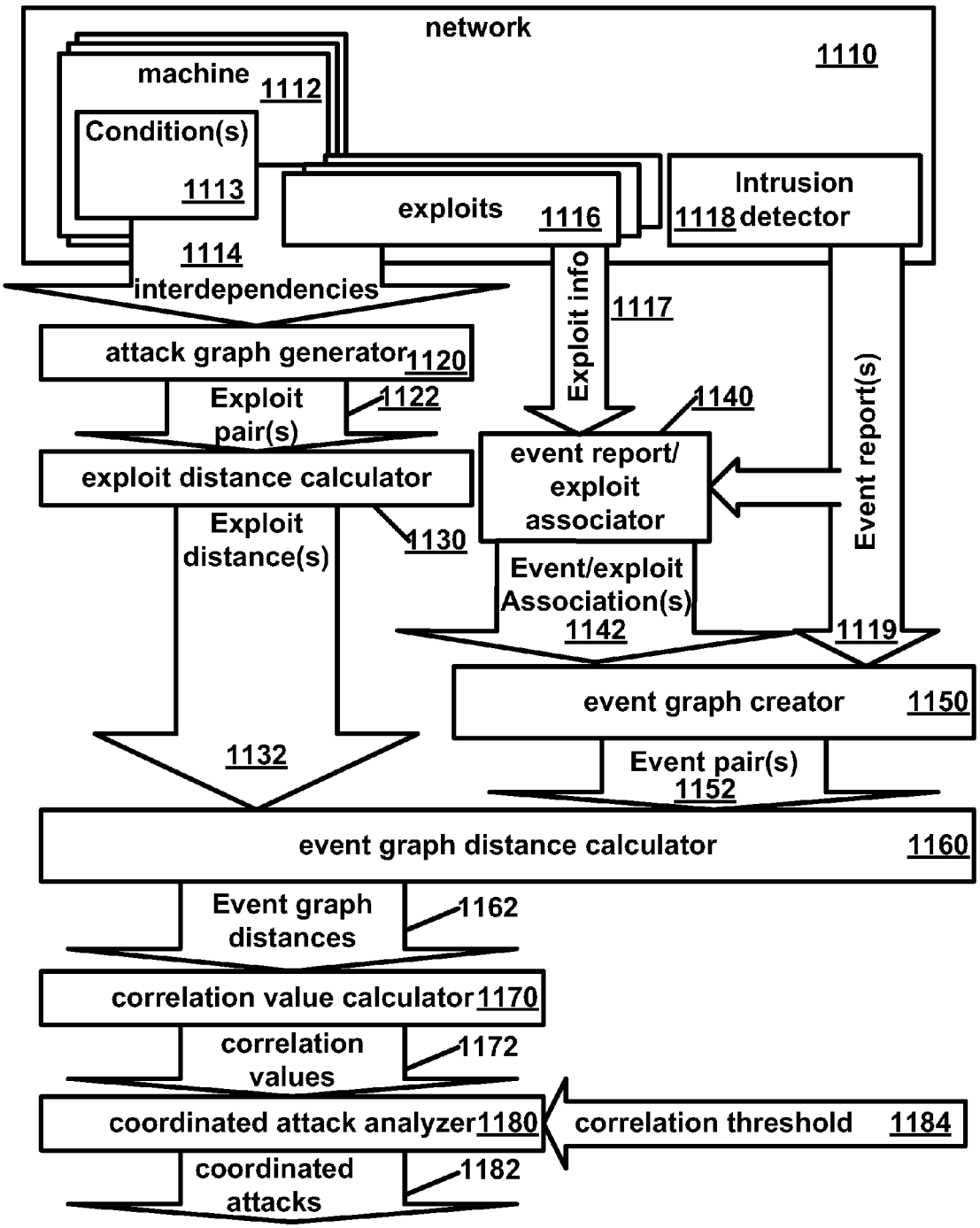
FIG. 11 is a block diagram of an aspect of an embodiment of the present invention.

Aspects of the present invention may be embodied in a computer program stored on a tangible computer readable media. The computer program when executed by one or more processors, may cause the processors to correlate intrusion events using attack graph distances. FIG. 10 shows a flow diagram of an aspect of an embodiment of the system. FIG. 11 shows a related block diagram. At S1010, an attack graph is constructed for a network 1110. The machines 1112 may have conditions 1113. This attack graph may be constructed by an attack graph generator 1120 by mapping interdependencies 1114 among the multitude of exploits 1116 with respect to conditions 1113 on a multitude of processing machines 1112 in the network 1110. At least one of the exploits 1116 should include at least one precondition mapped to at least one postcondition. The conditions 1113 may include at least one of the preconditions and at least one of the postconditions. Precondition(s) may include elements of a computer network that contribute to a network attack vulnerability. Similarly, postcondition(s) may include elements of a computer network that contributes to a network attack vulnerability. The attack graph may use a low-order polynomial representation.

At S1020, exploit distances 1132 are determined by an exploit distance calculator 1130 for at least one exploit pair 1122. Each of the exploit pairs 1122 are a pair of the exploits 1116 on the attack graph. The exploit distances determination may include pre-computing at least one of the following: minimum exploit distances; average exploit distances; mean exploit distances; maximum exploit distances; and weighted exploit distances.

A multitude of event reports 1119 are received at S1030. The event reports 1119 are used to report intrusions detected by an intrusion detector 1118.

An event report/exploit associator 1140 creates event/exploit associations 1142 by associating event reports 1119 with exploits 1116 (described as exploit information 1117). This occurs at S1040.

At S1050, an event graph is created by event graph creator 1150 by mapping event reports 1119 to event/exploit associations 1142. The event graph may use a low-order polynomial representation.

Event graph distances 1162 are determined for event pair 1152 at S1060. Event pairs 1152 are a pair of event reports 1119 on the event graph.

A multitude of correlation values 1172 may be calculated by a correlation value calculator 1170 at S1070. The correlation values 1172 are calculated for event pair(s) 1152 using event graph distances 1162.

At S1080, a coordinated attack analyzer 1180 can look for coordinated attacks 1182 by analyzing correlation values 1172 using a correlation threshold 1184. This process may use processing filter(s). The filter(s) may include at least one of the following: a low pass filter; a linear filter; a non-linear filter; a moving average filter; a weighed filter; and a weighted moving average filter. Other types of filters may also be used.

The foregoing descriptions of embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications in form and detail as are suited to the particular use contemplated without departing from the spirit and scope of the present invention. In fact, after reading the above description, it will be apparent to one skilled in the relevant art(s) how to implement the invention in alternative embodiments. Thus, the present invention should not be limited by any of the above described example embodiments. In particular, it should be noted that, for example purposes, the above explanation utilizes modules. One skilled in the art will recognize that the above described modules may be implemented in many ways including as software modules written in many different computer languages such as assembly language, JAVA, or C. Similarly, the modules could be implemented as hardware using ASICs, PALs or other equivalent devices.

In addition, it should be understood that any figures, graphs, tables, examples, etc. which highlight the functionality and advantages of the present invention, are presented for example purposes only. The architecture of the present invention is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

Furthermore, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A device comprising:
 a) at least one intrusion detection device configure to log detected intrusions on a network; and
 b) at least one hardware processor configured to:
  i) generate a multitude of event reports, each of the multitude of event reports used to report detected intrusions;
  ii) associate each of the multitude of event reports with at least one of a multitude of exploits, the multitude of exploits mapped on an attack graph for the network, the attack graph constructed by mapping interdependencies among the multitude of exploits with respect to a multitude of conditions on a multitude of processing machines in the network, at least one of the multitude of exploits including at least one precondition mapped to at least one postcondition, the multitude of conditions including at least one of the at least one precondition and at least one of the at least one postcondition;
  iii) determine exploit distances for at least one exploit pair, each of the at least one exploit pair being a pair of the multitude of exploits on the attack graph;
  iv) create an event graph by mapping at least one of the multitude of event reports to at least one other of the multitude of event reports;
  v) determine event graph distances for at least one event pair, each of the at least one event pair being a pair of the multitude of event reports on the event graph;
  vi) calculate a multitude of correlation values, each of the multitude of correlation values calculated for at least one of the at least one event pair using the event graph distances; and
  vii) look for coordinated attacks by analyzing the multitude of correlation values using a correlation threshold.

2. The device according to claim 1, wherein, at least one filter is employed to look for coordinated attacks.

3. The device according to claim 2, wherein the at least one filter includes at least one of the following:
 a low pass filter
 b) a linear filter;

c) a non-linear filter;
d) a moving average filter;
e) a weighed filter; and
f) a weighted moving average filter.

4. The device according to claim 1, wherein the attack graph uses a low-order polynomial representation.

5. The device according to claim 1, wherein the event graph uses a low-order polynomial representation.

6. The device according to claim 1, wherein the at least one hardware processor is further configured to pre-compute at least one of the following:
a) a minimum exploit distance;
b) an average exploit distance;
c) a mean exploit distance;
d) a maximum exploit distance; and
e) a weighted exploit distance.

7. The device according to claim 1, wherein at least one of the at least one precondition includes elements of a computer network that contributes to a network attack vulnerability.

8. The device according to claim 1, wherein at least one of the at least one postcondition includes elements of a computer network that contributes to a network attack vulnerability.

9. The device according to claim 1, wherein the device is configured to be connected to the network.

10. The device according to claim 1, wherein at least one of the at least one hardware processor is not connected to the network.

* * * * *